United States Patent [19]

Martini

[11] Patent Number: 4,599,276

[45] Date of Patent: Jul. 8, 1986

[54] HEAT-STERILIZABLE LAMINATE FILMS

[75] Inventor: Francesco Martini, Rho, Italy

[73] Assignee: W. R. Grace & Co., Cryovac Div., Duncan, S.C.

[21] Appl. No.: 663,650

[22] Filed: Oct. 22, 1984

[30] Foreign Application Priority Data

Nov. 9, 1983 [GB] United Kingdom ................. 8329850

[51] Int. Cl.[4] ................................................ B32B 27/08

[52] U.S. Cl. ........................................ 428/520; 428/35; 428/349; 428/522

[58] Field of Search .................. 428/35, 522, 520, 349

[56] References Cited

U.S. PATENT DOCUMENTS

| | | | |
|---|---|---|---|
| 3,361,852 | 1/1969 | Bassett | 260/897 |
| 4,266,542 | 5/1981 | Becker et al. | 128/214 |
| 4,375,531 | 3/1983 | Ross | 525/93 |
| 4,407,874 | 10/1983 | Gehrke | 428/35 |
| 4,448,792 | 5/1984 | Schirmer | 428/35 |
| 4,457,960 | 7/1984 | Newsome | 428/35 |
| 4,465,487 | 8/1984 | Nakamura et al. | 428/35 |
| 4,501,780 | 2/1985 | Walters et al. | 428/35 |

FOREIGN PATENT DOCUMENTS 0087080 2/1983 European Pat. Off. .

*Primary Examiner*—Edith Buffalow

*Attorney, Agent, or Firm*—John J. Toney; William D. Lee, Jr.; Mark B. Quatt

[57] ABSTRACT

A heat-sterilizable laminate film especially useful for making disposible pouches for sterile injectable compositions comprises an ethylene-vinyl acetate copolymer layer and on either side of the said layer a layer of a propylene-ethylene copolymer which may contain an impact modifier. The laminate may be cross-linked by irradiation.

5 Claims, No Drawings

HEAT-STERILIZABLE LAMINATE FILMS

This invention relates to heat sterilizable laminated films suitable inter alia for the packaging of liquids for parenteral administration.

It is convenient in current medical practice for liquids for parenteral administration to be supplied in the form of disposable, flexible pouches. Such pouches must be collapsible, transparent, and of adequate mechanical strength. They must also be able to resist the relatively high temperatures required for heat sterilization of their contents. At present, such flexible pouches are customarily made of highly plasticized polyvinyl chloride. While this material meets the requirements mentioned, it is not entirely satifactory because of the possibility of migration of plasticizer from the polyvinyl chloride into the contents of the pouch so that the latter becomes contaminated by potentially toxic material. Until now, however, no satisfactory alternative to highly plasticized polyvinyl chloride has been available.

The present invention provides a novel heat sterilizable laminate suitable for making flexible pouches for liquids for parenteral administration, which are made from substantially non-toxic materials which possess satisfactory properties without the incorporation of any additives which might present a toxicity problem.

The heat sterilizable laminate films of the present invention comprise a layer of an ethylene-vinyl acetate copolymer containing 18 to 40 percent by weight of vinyl acetate units and, on each side of the said layer, a layer of 60 to 100 percent by weight of a propylene-ethylene copolymer containing 2 to 4.5 percent by weight of ethylene units, and 40 to 0 percent by weight of an impact modifier containing 30 to 63 parts by weight of an ethylene-propylene elastomer or ethylene-propylene-diene elastomer having an ethylene content of 55 to 70 weight percent and 70 to 37 parts by weight of a thermoplastic ethylene-vinyl acetate copolymer containing 9 to 40 percent of vinyl acetate units.

These three layers may constitute the whole of the laminate film, but it is within the scope of the invention to provide additional layers, more especially for the purpose of improving the bonding between the specified ethylene-vinyl acetate and propylene-ethylene copolymer layers, and/or improving the barrier properties of the laminate by inclusion of an oxygen barrier layer such as a layer based on polyvinylidene dichloride. Normally, the ethylene-propylene copolymer layers are on the surface of the laminate, and the ethylene-vinyl acetate copolymer layer or layers are internal layers of the film.

The ethylene-vinyl acetate copolymer used in the novel laminates contains 18 to 40 percent and preferably 18 to 30 percent by weight of vinyl acetate units. Such copolymers are commercially available. Typical such copolymers have a melt flow index of 0.7 to 7 g/10 mins., a density of 0.930 to 0.970 g/cm$^3$, and a Vicat softening point of 40° to 80° C.

The propylene-ethylene copolymer used in the new films contains 2 to 4.5, and preferably about 4 percent by weight of ethylene units. Such copolymers are commercially available and typical such polymers have a melt flow index of 3 to 7 g/10 mins., a density of 0.890 to 0.910 g/cm$^3$, and a Vicat softening point of 120° to 130° C.

Preferably, the properties, and in particular the mechanical resistance, of the propylene-ethylene copolymer layer are improved by incorporation therein of an impact modifier. Appropriate impact modifiers contain 30 to 63 parts by weight of an ethylene-propylene or ethylene-propylene-diene elastomer having an ethylene content of 55 to 70 weight percent and 30 to 37 parts by weight (for each 100 parts by weight in all) of a thermoplastic ethylene-vinyl acetate copolymer containing 9 to 40 percent by weight of vinyl acetate units. Such impact modifiers are commercially available and are described in particular in European Patent Publication No. 32804 (Exxon Research Engineering Co.). The liquid hydrocarbon process oils referred to in that publication are not however included in the impact modifiers used herein.

The novel laminates may advantageously be cross-linked in order to improve their mechanical properties. Such cross-linking is particularly advantageous when no impact modifier is included in the layers based on the propylene-ethylene copolymer, but may also give a valuable improvement in the properties of the laminate even when the impact modifier is included. In such cases, the adhesion of the ethylene-propylene copolymer layers to the ethylene-vinyl acetate copolymer layers may be improved by effecting cross-linking by irradiation of the laminate after it has been formed. A dosage of 1 to 6 and preferably about 2 megarad is generally appropriate.

The laminates of the present invention are not oriented, but are conveniently produced by hot blowing or water quench co-extrusion to produce film having the required thickness. The individual layers of the laminate may be co-extruded through a multi-layer circular die in accordance with techniques which are well known in the art.

The laminate films of the present invention have properties which make them particularly suitable for manufacture of flexible pouches designed to contain liquids for parenteral administration. The pouches are transparent and collapsible and have good mechanical resistance. Moreover, they resist the temperatures required for heat sterilization of the contents (about 120° C.). It is a further advantage of the new laminates that pouches made therefrom may be heatsealed using a radio frequency sealer, provided that the frequency of the latter is 70 MHz. Conventional sealers working at frequencies of 20 to 30 MHz are not suitable.

The thickness of the new laminates is chosen to be appropriate for the contemplated end use. Normally, the ethylene-vinyl acetate layer makes up the greater part of the thickness of the film. For example, for an overall thickness of 150 to 300 microns, the ethylene-vinyl acetate copolymer layer may constitute 50 to 95 percent of the total thickness. The outer layers of propylene-ethylene copolymer (and optional other layers) may then make up the remainder of the thickness. The inner layer of the propylene-ethylene copolymer (i.e.

that which contacts the contents of the pouch) is preferably somewhat thicker than the external layer, and may be for example of from 1 to 3 times the thickness of the latter.

The following are examples of heat sterilizable laminate films in accordance with the present invention. In place of the hot blowing inventions in these Examples, water quench co-extrusion can be used.

EXAMPLE 1

A three layer laminate film is produced by extrusion through a multi layer circular die followed by hot blowing, of the following materials:

The inside surface and outside surface layers were made of a composition comprising 80 percent by weight of a propylene-ethylene copolymer and 20 percent by weight of an impact modifier. The ethylene-propylene copolymer contained 4 percent by weight of ethylene units, and had a melt flow index of 5 g/10 mins., a density of 0.900 g/cm$^3$, and a Vicat softening point of 122° C. The impact modifier was a commercially available blend of an ethylene-propylene elastomer and an ethylene-vinyl acetate copolymer containing 40 percent by weight of vinyl acetate units. The modifier had a melt flow index of 0.7, an elongation at least of 735 percent, and a tensile strength of 835N/cm$^2$.

The inner layer of ethylene-vinyl acetate copolymer was based on a copolymer containing 26 percent by weight of vinyl acetate units, and having a melt flow index of 2 g/10 mins., a density of 0.95 g/cm$^3$, and a Vicat softening point of 50° C.

EXAMPLE II

A three layer laminate film was produced in the manner described in Example I using for the inside surface and outside surface layers the same propylene-ethylene copolymer as in Example I, but without the addition of any impact modifier. The inner layer of ethylene-vinyl acetate copolymer was based on a copolymer containing 28 percent by weight of vinyl acetate units and having a melt flow index of 6 g/10 mins., a density of 0.95 g/cm$^3$, and a Vicat softening point of 46° C.

As this laminate film did not contain any impact modifier or adhesive, it was irradiated at 2M Rad to increase bonding between the layers.

EXAMPLE III

A five layer laminate film was produced using the same propylene-ethylene copolymer for the inside surface and outside surface layers as in Example II and the same inner layer of ethylene-vinyl acetate copolymer as in Example II. In addition, adhesive layers of CXA (DuPont) or Plexar (Chemplex) were provided between the ethylene-vinyl acetate copolymer layer and the two outer layers. These adhesives are ethylene copolymer having a melt flow index of 0.7 to 5 g/10 mins., a density of 0.02 to 0.96 g/cm$^3$, and a Vicat softening point of 30° to 90° C.

In the foregoing Examples I to III, the overall thickness of the laminate may be for example 200 microns with the inner layer of ethylene-vinyl acetate copolymer constituting about 170 microns. The remainder of the overall thickness is made up by the propylene-ethylene copolymer layers and adhesive layers (if any). The inside surface propylene-ethylene copolymer layer is preferably about twice as thick as the outside surface propylene-ethylene copolymer layer.

I claim:

1. A heat sterilizable laminate consisting of a layer of an ethylene-vinyl acetate copolymer containing 18 to 40 percent by weight of vinyl acetate units said layer being substantially unoriented and, on each side of the said layer, a layer of 60 to 100 percent by weight of a propylene-ethylene copolymer containing 2 to 4.5 percent by weight of ethylene units, and 40 to 0 percent by weight of an impact modifier containing 30 to 63 parts by weight of an ethylene-propylene elastomer or ethylene-propylene-diene elastomer having an ethylene content of 55 to 70 weight percent and 70 to 37 parts by weight of a thermoplastic ethylene-vinyl acetate copolymer containing 9 to 40 percent of vinyl acetate units.

2. A laminate according to claim 1 consisting of the said layer of an ethylene-vinyl acetate copolymer having on each side a layer of the said propylene-ethylene copolymer containing no impact modifier, the polymers of the said laminate being cross-linked by irradiation.

3. A laminate according to claim 1 consisting of five layers, namely a core layer of the said ethylene-vinyl acetate copolymer, two outer layers of the said propylene-ethylene copolymer, and two layers of adhesive between the said outer layers and the said core layer.

4. A laminate according to any one of claims 2 and 3 in which the said ethylene-vinyl acetate copolymer contains 18 to 30 percent by weight of vinyl acetate units and has a melt flow index of 0.7 to 7 g/10 mins., a density of 0.930 to 0.970 g/cm$^3$, and a Vicat softening point of 40° to 80° C.

5. A laminate according to any one of claims 1, 2, and 3 in which the propylene-ethylene copolymer has a melt flow index of 3 to 7 g/10 mins., a density of 0.890 to 0.910 g/cm$^3$, and a Vicat softening point 120° to 130° C.

* * * * *